United States Patent
Pan et al.

(10) Patent No.: US 7,523,681 B2
(45) Date of Patent: Apr. 28, 2009

(54) BALL SCREW DEVICE HAVING DEFLECTING MEMBER BACKGROUND OF THE INVENTION

(75) Inventors: Hung Sung Pan, Taichung (TW); Chien Wei Tsou, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 237 days.

(21) Appl. No.: 11/636,332

(22) Filed: Dec. 7, 2006

(65) Prior Publication Data
US 2008/0134822 A1    Jun. 12, 2008

(51) Int. Cl.
*F16H 25/22* (2006.01)

(52) U.S. Cl. .............. 74/424.82; 74/424.81; 74/424.87; 74/424.86

(58) Field of Classification Search .. 74/424.81–424.93
See application file for complete search history.

(56) References Cited

U.S. PATENT DOCUMENTS

| 4,357,838 | A | 11/1982 | Blaurock et al. | ........ 74/424.8 R |
| 6,425,302 | B2 | 7/2002 | Greubel | .................... 74/424.87 |
| 2004/0211280 | A1* | 10/2004 | Nishimura et al. | ....... 74/424.82 |
| 2008/0053260 | A1* | 3/2008 | Liao et al. | ................ 74/424.87 |

* cited by examiner

*Primary Examiner*—Richard W L Ridley
*Assistant Examiner*—Timothy J Murphy
(74) *Attorney, Agent, or Firm*—Charles E. Baxley

(57) ABSTRACT

A ball screw device includes a ball nut having an inner thread formed by a number of helical groove portions and helical ridges, and an opening and a depression communicating with each other, and a channel communicating with the depression of the ball nut, a radially inserted deflecting member has a block engaged into the opening of the ball nut and an extension extended from the block and engaged into the depression of the ball nut for anchoring the deflecting member to the ball nut. A fastener may be engaged through the deflecting member and engaged with the ball nut for securing the deflecting member to the ball nut.

3 Claims, 5 Drawing Sheets

BALL SCREW DEVICE HAVING DEFLECTING MEMBER BACKGROUND OF THE INVENTION

BACKGROUND OF THE INVENTION

1. Field of the Invention

The present invention relates to a ball screw device, and more particularly to a ball screw device having a radially inserted and secured deflecting member for effectively and smoothly receiving and guiding the balls or the bearing members to move relative to the ball nut and the screw shaft, and for facilitating the rotational movement of the ball nut and the screw shaft relative to each other in great rotational speeds.

2. Description of the Prior Art

Typical ball screw devices comprise a ball nut rotatably and/or moveably engaged onto a screw shaft, and normally arranged to allow the ball nut to be rotated and/or moved relative to the screw shaft in great rotational speeds. For allowing the ball nut to be smoothly rotated and moved relative to the screw shaft, a suitable bearing device or lubricating structure is further required to be provided and engaged between the ball nut and the screw shaft, for facilitating the rotational movement between the ball nut and the screw shaft.

For example, U.S. Pat. No. 4,357,838 to Blaurock et al. discloses one of the typical ball screw devices including a deflecting member provided or engaged into the ball nut for forming a ball return passage or an endless ball train guiding passage and for receiving a number of balls or a ball train therein, and for allowing the balls or the ball train to be engaged between the ball nut and the screw shaft to facilitate the rotational movement between the ball nut and the screw shaft.

In Blaurock et al., the deflecting member includes a prismatic recess formed into an inner surface of a nut body and extends axially inwardly from an end face of the nut body. However, the prismatic recess may not be used to receive and to guide the balls or ball train into any inner and radially extended channels in the nut body, such that the balls or the ball train may not be effectively guided to move into the corresponding axial return passages of the ball nut.

U.S. Pat. No. 6,425,302 to Greubel discloses another typical ball screw device including two deflecting members attached to or engaged into the ball nut and having a curved deflecting passage formed therein for guiding or deflecting the balls or the ball train, and two fastening pins are required to secure each of the deflecting members to the ball nut.

However, the fastening pins may only be used to anchor the deflecting members to the ball nut, but may not solidly secure and position the deflecting members to the ball nut. For allowing the deflecting members to be solidly secured and positioned the ball nut, the cutouts for receiving the deflecting members and the blind bores for receiving the fastening pins are required to be precisely machined and formed in the ball nut, otherwise, the deflecting members may be loosened relative to the ball nut and may not be used to suitably guide the balls or ball train through the endless ball train guiding passage of the ball nut.

The present invention has arisen to mitigate and/or obviate the afore-described disadvantages of the conventional ball screw devices for such as machine tools or the like.

SUMMARY OF THE INVENTION

The primary objective of the present invention is to provide a ball screw device including a radially inserted deflecting member for effectively and smoothly receiving and guiding the balls or the bearing members to move relative to the ball nut and the screw shaft, and for facilitating the rotational movement of the ball nut and the screw shaft relative to each other in great rotational speeds.

The other objective of the present invention is to provide a ball screw device including a radially inserted deflecting member having a curved pathway for forming an endless ball rolling passage in the ball nut and for smoothly receiving and guiding the bearing members.

The further objective of the present invention is to provide a ball screw device including a radially inserted deflecting member having two curved pathways and having two curved bars for enclosing the curved pathways and for stably receiving and guiding the bearing members.

In accordance with one aspect of the invention, there is provided a ball screw device comprising a ball nut including a bore formed therein, and including an inner thread formed therein and defined by a plurality of helical groove portions and a plurality of helical ridges, the ball nut including at least one opening formed therein and communicating with the bore of the ball nut and including a depression formed therein and communicating with the opening of the ball nut, and the ball nut including a channel formed therein and communicating with the depression of the ball nut, at least one deflecting member including a block engaged into the opening of the ball nut, and including an extension extended from the block and engaged into the depression of the ball nut, and the deflecting member including an orifice formed therein, and including a curved slot formed therein for communicating the channel and the helical groove portions of the ball nut with each other, and a fastener engaged through the orifice of the deflecting member and engaged with the ball nut for securing the deflecting member to the ball nut.

The ball nut includes a partition formed therein and located between the depression and the bore of the ball nut for engaging with the extension of the deflecting member, and for anchoring the deflecting member to the ball nut.

The curved slot of the deflecting member includes a first mouth and a second mouth formed in the extension and the block respectively and aligned with and communicating with the channel and the helical groove portions of the ball nut respectively.

The deflecting member includes a space formed therein and communicating with the orifice of the deflecting member for receiving an enlarged head of the fastener. The deflecting member includes a first deflecting segment and a second deflecting segment anchored together.

The first and the second deflecting segments each include a portion of the curved slot formed therein for allowing the curved slot to be easily and precisely formed within the deflecting member.

The second deflecting segment includes at least one cavity formed therein, and the first deflecting segment includes at least one projection extended therefrom for engaging with the cavity of the second deflecting segment and for anchoring the first and the second deflecting segments with each other.

The second deflecting segment includes a second cavity formed therein, and the first deflecting segment includes a second projection extended therefrom for engaging with the second cavity of the second deflecting segment and for anchoring the first and the second deflecting segments with each other. The second cavity of the second deflecting segment and the second projection of the first deflecting segment include a diameter different from each other for anchoring the first and the second deflecting segments with each other.

The opening of the ball nut and the block of the deflecting member include an inclination identical to that of the helical groove portions of the ball nut. The opening of the ball nut and the block of the deflecting member are perpendicular to the ball nut.

It is preferable that the block of the deflecting member includes a width "D" smaller than a width "d" formed by one helical groove portion and two helical ridges of the ball nut.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
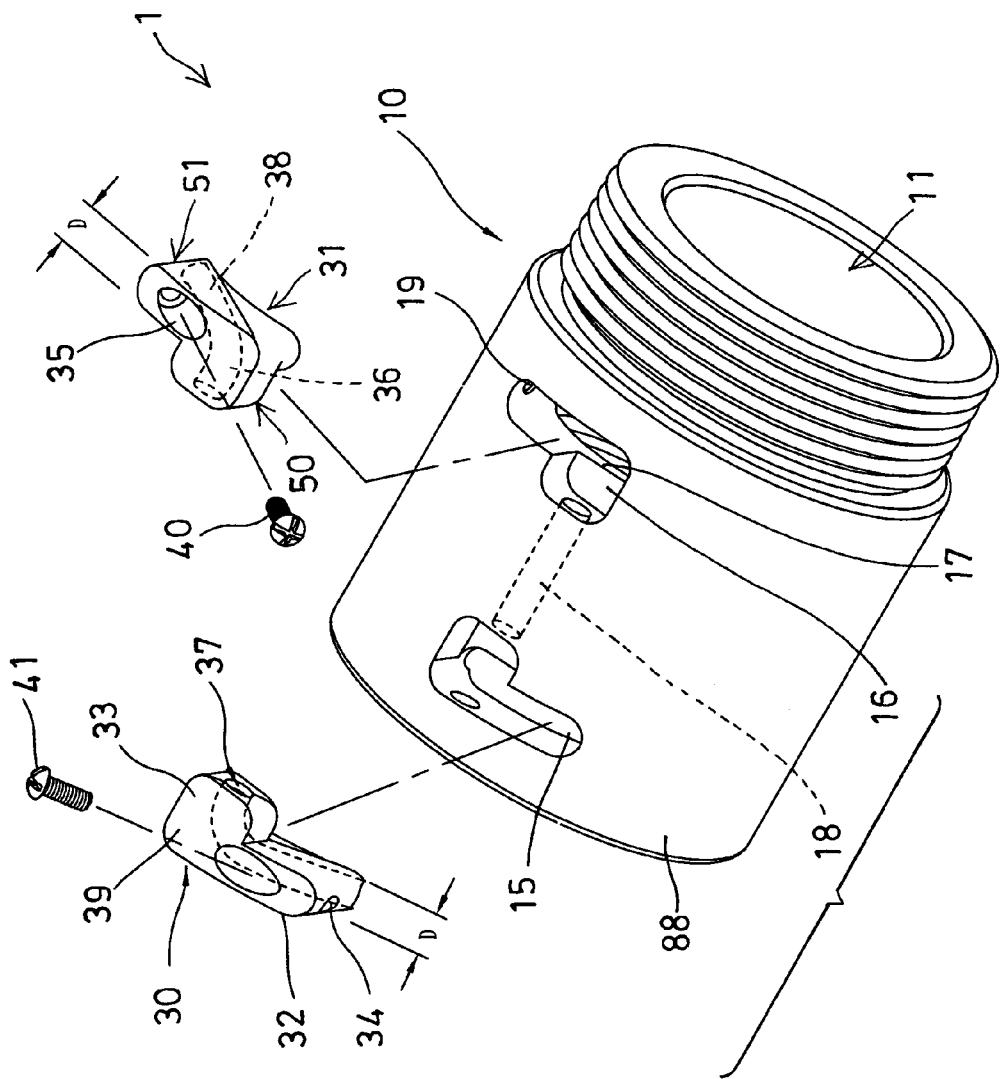
FIG. 1 is a partial exploded view of a ball screw device in accordance with the present invention.
Figure 2:
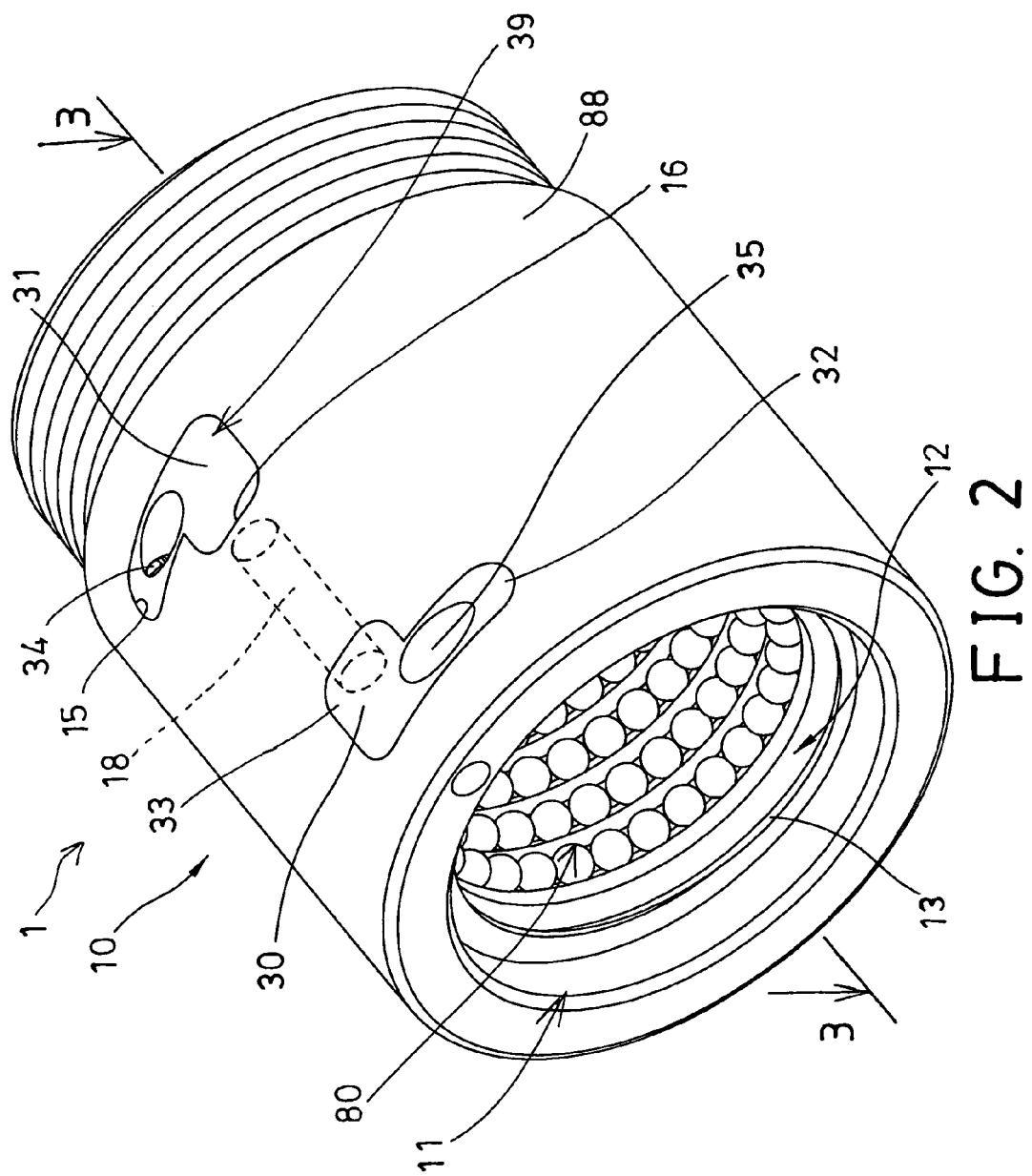
FIG. 2 is a partial perspective view of the ball screw device, in which a screw shaft has been removed or not shown in the drawing figure.
Figure 3:
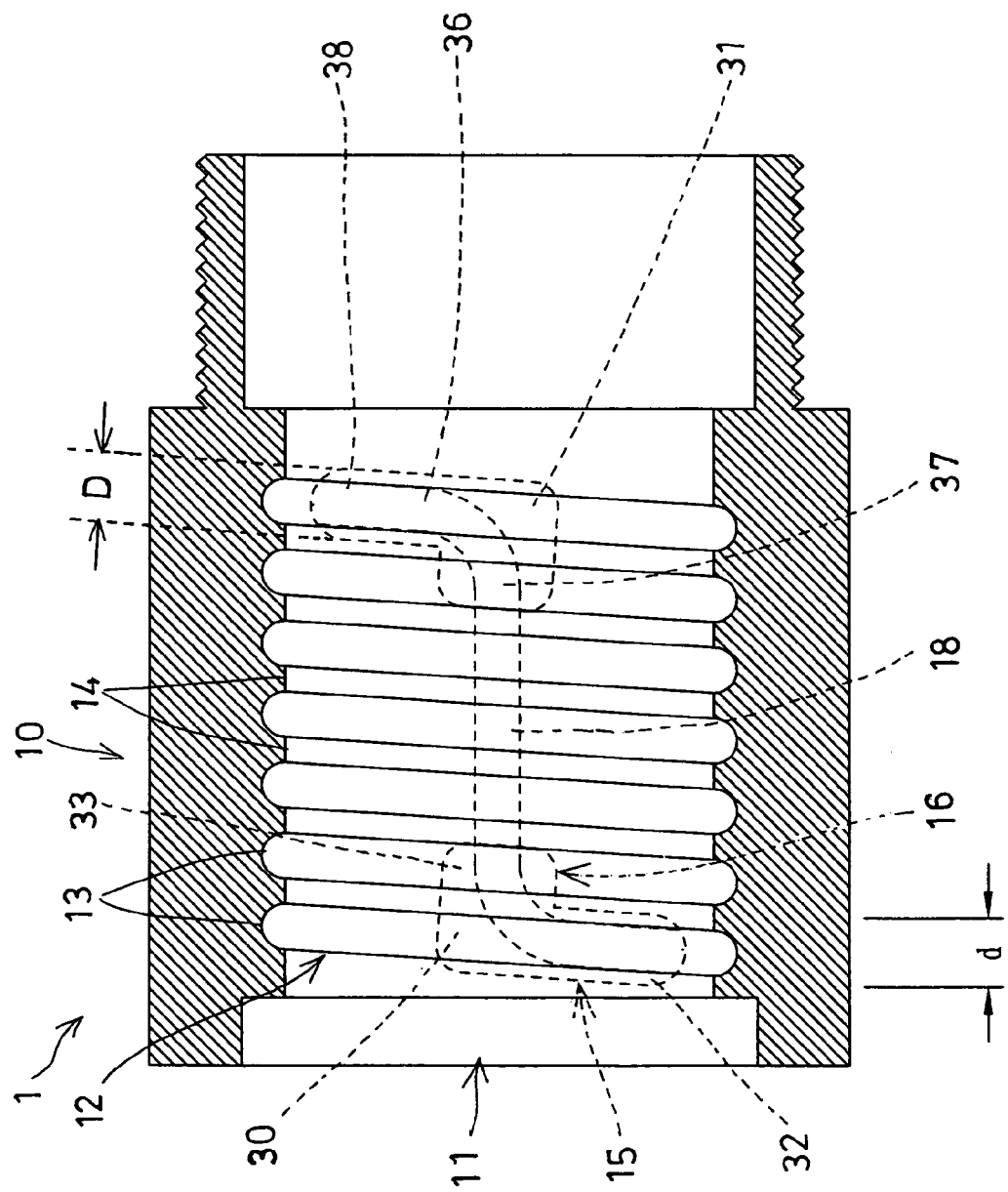
FIG. 3 is a cross sectional view of the ball screw device taken along lines 3-3 of FIG. 2.

Referring to the drawings, and initially to FIGS. 1-3, a ball screw device 1 in accordance with the present invention comprises an outer ball nut 10 including a bore 11 formed therein and having an inner thread 12 formed therein, the inner thread 12 of the ball nut 10 includes a number of peripheral and helical groove portions 13 (FIGS. 2-4) formed and defined by a number of peripheral and helical ridges 14 (FIGS. 3, 4) for threading with or for engaging with an outer thread of a typical screw shaft (not shown), and thus for allowing the ball nut 10 to be moved along the screw shaft, or for allowing the screw shaft to be rotated and moved relative to the ball nut 10. The threading engagement and/or the rotational engagement between the ball nut 10 and the screw shaft is typical and will not be described in further details.

A multiple turn, helical raceway will be formed between the ball nut 10 and the screw shaft for rotatably and/or movably receiving one or more groups of balls or rollers or rolling or ball bearing members 80 (FIG. 2) therein which may facilitate the rotating movement of the ball nut 10 relative to the screw shaft when the screw shaft is forced to rotate relative to the ball nut 10 or when the ball nut 10 is forced to rotate relative to the screw shaft, in order to constitute the primary or basic structure of the ball screw device 1. The ball nut 10 includes one or more (such as two) openings 15 formed therein (FIGS. 1-4) and communicating with the bore 11 of the ball nut 10 (FIG. 1), and one or more (such as two) depressions 16 formed therein and communicating with the openings 15 of the ball nut 10 respectively for receiving ball guide or deflecting members 30, 31 therein.

The ball nut 10 further includes one or more (such as two) partitions 17 formed therein and located between the depressions 16 and the bore 11 of the ball nut 10 respectively for forming or defining the depressions 16 of the ball nut 10 respectively, and for engaging with the ball guide or deflecting members 30, 31, and thus for positioning or anchoring the ball guide or deflecting members 30, 31, and further includes one or more channels 18 formed therein and communicating with the openings 15 and/or the depressions 16 of the ball nut 10, and further includes one or more (such as two) screw holes 19 formed therein (FIG. 1) and communicating with the openings 15 of the ball nut 10 respectively. The channel 18 is longitudinally formed in the ball nut 10 and passing through or intersecting with the opening 15 and/or the depressions 16 of the ball nut 10.

The deflecting members 30, 31 are provided for engaging into the openings 15 and/or the depressions 16 of the ball nut 10 respectively, and each include a primary body member or block 32 having a shape or structure identical or corresponding to that of the openings 15 of the ball nut 10 respectively for snugly engaging into the openings 15 of the ball nut 10 respectively, and each include a secondary body member or extension 33 laterally or axially extended from the block 32 and having a shape or structure identical or corresponding to that of the depressions 16 of the ball nut 10 respectively for snugly engaging into the depressions 16 of the ball nut 10 respectively. The extension 33 may be engaged with the partitions 17 for stably anchoring or positioning the extension 33 and thus the deflecting members 30, 31 to the ball nut 10.

The openings 15 and the depressions 16 of the ball nut 10 include different sizes or dimensions or lengths or widths or areas or volumes for suitably or snugly receiving the block 32 and the extension 33 of the deflecting members 30, 31 respectively. The deflecting members 30, 31 each further include an orifice 34 formed therein, such as formed in the block 32 for receiving a fastener 40 therein which may stably secure the deflecting members 30, 31 to the ball nut 10, and each further include an enlarged space 35 formed therein and communicating with the orifice 34 of the block 32 of the deflecting members 30, 31 for receiving an enlarged head 41 of the fastener 40, and each further include a curved slot 36 formed therein for communicating the channels 18 and the helical groove portions 13 or the inner thread 12 of the ball nut 10 with each other and for guiding the ball bearing members 80 to move into or out of the channels 18 of the ball nut 10 respectively, and thus for forming the endless ball rolling passages.

For example, the curved slots 36 of the deflecting members 30, 31 each include a first mouth 37 and a second mouth 38 formed in the extension 33 and the block 32 respectively and aligned with and/or communicating with the channels 18 and the helical groove portions 13 or the inner thread 12 of the ball nut 10 respectively for forming the endless ball rolling passages and thus for smoothly guiding the ball bearing members 80 to move into or through or out of the channels 18 and the helical groove portions 13 or the inner thread 12 of the ball nut 10 respectively, and thus for facilitating the rotational and/or the sliding movement between the ball nut and the screw shaft.

Figure 5:
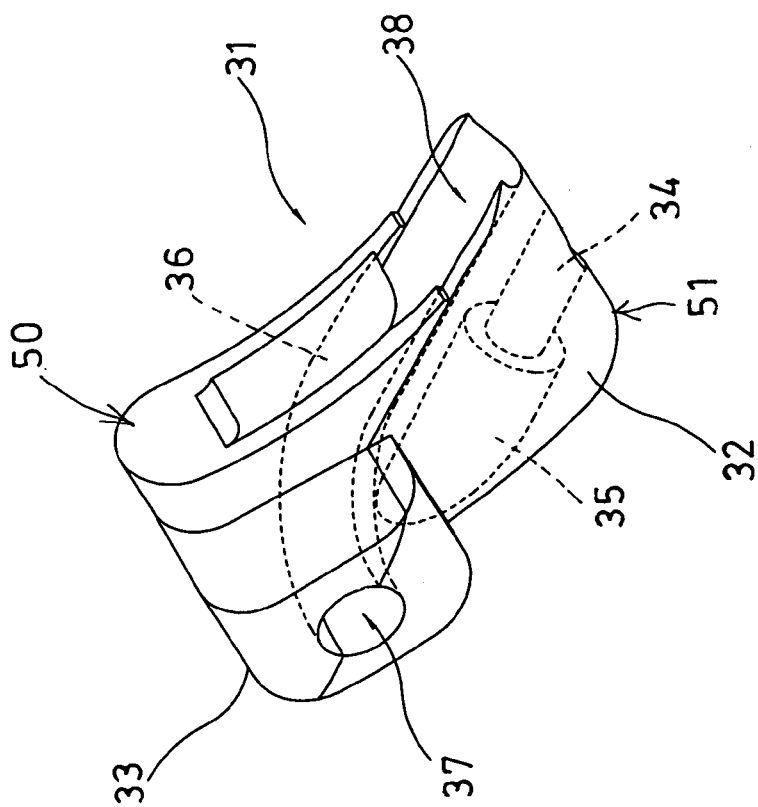
FIG. 5 is an enlarged perspective view illustrating one of the deflecting members of the ball screw device.
Figure 6:
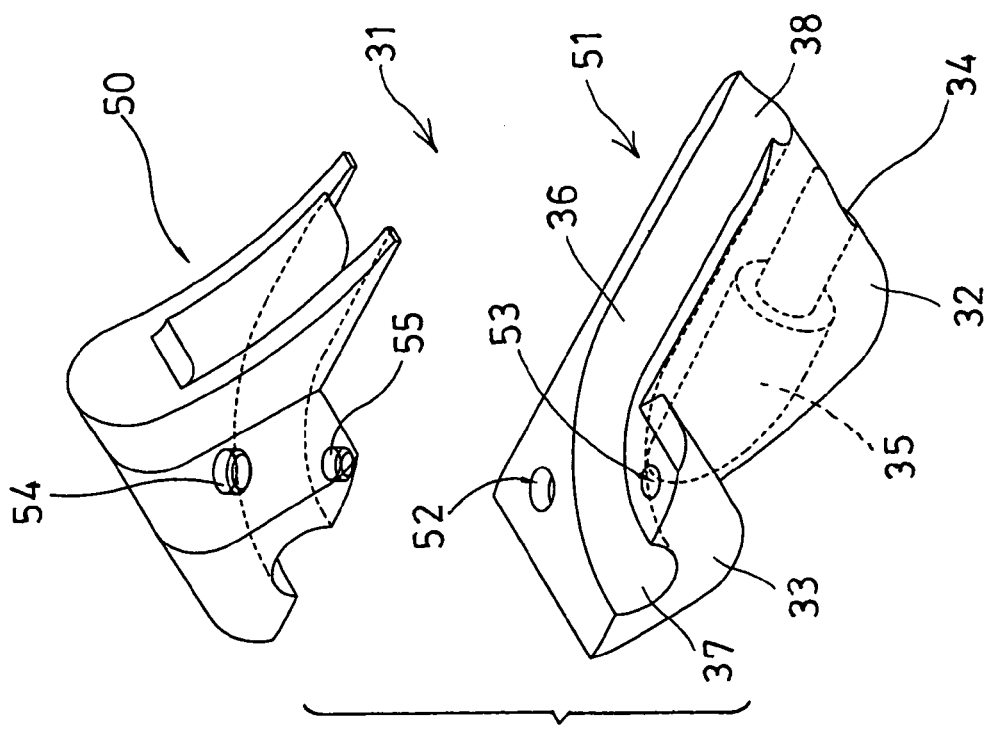
FIG. 6 is another partial exploded view illustrating the deflecting member of the ball screw device as shown in FIG. 5.

As shown in FIGS. 5-6, the deflecting members 30, 31 each may be cut into two separated deflecting segments 50, 51 or formed by the two separated deflecting segments 50, 51, and each may have one half or a portion of the curved slots 36 formed therein for allowing the curved slots 36 to be easily and precisely formed or machined within the deflecting members 30, 31 respectively. One of the deflecting segments 51 may include one or more projections or cavities 52, 53 formed therein, and the other deflecting segment 50 may include one or more cavities or projections 54, 55 extended therefrom for engaging with the projections or cavities 52, 53 of the deflecting segment 51 and for positioning or anchoring the deflecting segments 50, 51 with each other.

It is preferable that the projections or cavities 52, 53 of the deflecting segment 51 and the cavities or projections 54, 55 of the other deflecting segment 50 include different sizes or dimensions or diameters for stably positioning or anchoring the deflecting segments 50, 51 with each other. As also shown in FIG. 1, the deflecting segment 50 may be engaged with the partition 17 and the other deflecting segment 51 may be engaged with the deflecting segment 50 for stably retaining the deflecting segment 50 between the partition 17 and the other deflecting segment 51, and the other deflecting segment 51 may be stably secured to the ball nut 10 with the fasteners 40. It is preferable that the deflecting segments 51 or the deflecting members 30, 31 each may include an outer surface 39 corresponding to the outer surface 88 of the ball nut 10 (FIGS. 1, 2) for flushing with the outer surface 88 of the ball nut 10 and for forming a completed or integrated structure for the ball nut 10.

Figure 4:
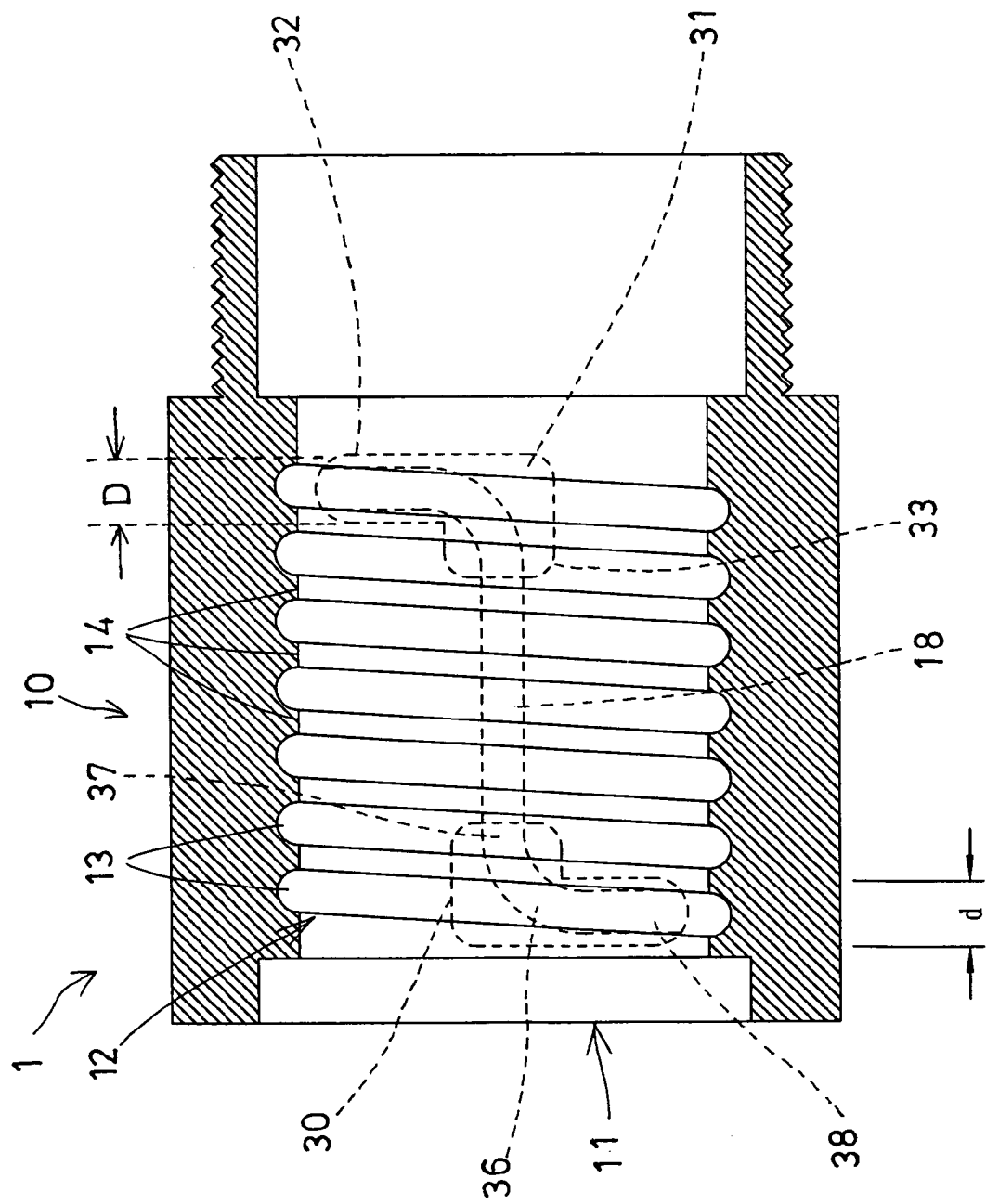
FIG. 4 is a cross sectional view similar to FIG. 3 illustrating the other arrangement of the deflecting member of the ball screw device.

As shown in FIGS. 3-4, It is preferable that the block 32 of the deflecting member 30, 31 includes a width "D" smaller than the width "d" formed by one helical groove portion 13 and two helical ridges 14 of the ball nut 10 such that the two neighboring helical ridges 14 of the ball nut 10 are only required to be partially cut in order to form the opening 15 of the ball nut 10 and to receive the block 32 of the deflecting member 30, 31. As shown in FIG. 3, the opening 15 of the ball nut 10 and the block 32 and/or the extension 33 of the deflecting members 30, 31 may include an inclination identical to that of the helical groove portion 13 and the helical ridges 14 of the ball nut 10, or may be perpendicular to the longitudinal direction or axis of the ball nut 10 as shown in FIG. 4.

It is to be noted that the engagement of the block 32 and the extension 33 of the deflecting members 30, 31 in the opening 15 and the depression 16 of the ball nut 10 respectively may suitably or snugly receive and retain and attach or secure the deflecting members 30, 31 to the ball nut 10 and may prevent the deflecting members 30, 31 from moving laterally or sidewise or axially relative to the ball nut 10. In addition, the fasteners 40 may solidly secure the deflecting members 30, 31 to the ball nut 10 and may prevent the deflecting members 30, 31 from been loose or from becoming loose relative to the ball nut 10.

Accordingly, the ball screw device in accordance with the present invention includes a radially inserted deflecting member for separating and for effectively and smoothly receiving and guiding the balls or bearing members to move relative to the ball nut and the screw shaft, and for facilitating the rotational movement of the ball nut and the screw shaft relative to each other in great rotational speeds.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball screw device comprising:
a ball nut including a bore formed therein, and including an inner thread formed therein and defined by a plurality of helical groove portions and a plurality of helical ridges, said ball nut including at least one opening formed therein and communicating with said bore of said ball nut and including a depression formed therein and communicating with said at least one opening of said ball nut, and said ball nut including a channel formed therein and communicating with said depression of said ball nut, said ball nut including a partition formed therein and located between said depression and said bore of said ball nut in a radial direction, at least one deflecting member including a block engaged into said at least one opening of said ball nut, and including an extension extended from said block and engaged into said depression of said ball nut and engaged with said partition of said ball nut for anchoring said at least one deflecting member to said ball nut, and said at least one deflecting member including an orifice formed therein, and including a curved slot formed therein for communicating said channel and said helical groove portions of said ball nut with each other, and said curved slot of said at least one deflecting member including a first mouth and a second mouth formed in said extension and said block respectively and aligned with and communicating with said channel and said helical groove portions of said ball nut respectively, said at least one deflecting member including a first deflecting segment and a second deflecting segment anchored together, said first and said second deflecting segments each including one half of said curved slot formed therein for allowing said curved slot to be easily and precisely formed within said at least one deflecting member, said second deflecting segment including at least one circular cavity and a second circular cavity formed therein, and said first deflecting segment including at least one projection and a second projection extended therefrom for engaging with said at least one circular cavity and said second circular cavity of said second deflecting segment and for anchoring said first and said second deflecting segments with each other, said second circular cavity of said second deflecting segment and said second projection of said first deflecting segment including a diameter different from that of said at least one circular cavity of said second deflecting segment and said at least one projection of said first deflecting segment for anchoring said first and said second deflecting segments with each other, said at least one deflecting member including a space formed therein and communicating with said orifice of said at least one deflecting member, said block of said at least one deflecting member including a width "D" smaller than a width "d" formed by one helical groove portion and two helical ridges of said ball nut and a fastener engaged through said orifice of said at least one deflecting member and engaged with said ball nut for securing said at least one deflecting member to said ball nut, and said fastener including an enlarged head received and engaged with said space of said at least one deflecting member.

2. The ball screw device as claimed in claim 1, wherein said at least one opening of said ball nut and said block of said at least one deflecting member include an inclination identical to that of said helical groove portions of said ball nut.

3. The ball screw device as claimed in claim 1, wherein said at least one opening of said ball nut and said block of said at least one deflecting member are perpendicular to said ball nut.

* * * * *